United States Patent
Hölzl et al.

(10) Patent No.: US 11,065,964 B2
(45) Date of Patent: Jul. 20, 2021

(54) METHOD FOR OPERATING A MOTOR VEHICLE

(71) Applicant: AUDI AG, Ingolstadt (DE)

(72) Inventors: Andreas Hölzl, Kranzberg (DE); Uwe Feldmann, Nassenfels (DE)

(73) Assignee: AUDI AG, Ingolstadt (DE)

( * ) Notice: Subject to any disclaimer, the term of this patent is extended or adjusted under 35 U.S.C. 154(b) by 38 days.

(21) Appl. No.: 16/356,058

(22) Filed: Mar. 18, 2019

(65) Prior Publication Data

US 2019/0322179 A1 Oct. 24, 2019

(30) Foreign Application Priority Data

Apr. 20, 2018 (DE) .................. 10 2018 206 050.9

(51) Int. Cl.
*B60L 7/18* (2006.01)
*B60L 7/22* (2006.01)
*B60L 15/20* (2006.01)

(52) U.S. Cl.
CPC .............. *B60L 7/18* (2013.01); *B60L 7/22* (2013.01); *B60L 15/2009* (2013.01); *B60L 2240/421* (2013.01); *B60L 2240/423* (2013.01)

(58) Field of Classification Search
CPC .......... B60W 30/18127; B60W 10/08; B60W 10/18; B60W 10/196; B60L 7/12; B60L 7/14; B60L 7/16
See application file for complete search history.

(56) References Cited

U.S. PATENT DOCUMENTS

| | | | |
|---|---|---|---|
| 5,511,859 A * | 4/1996 | Kade ................... | B60W 20/13 303/3 |
| 7,552,705 B2 * | 6/2009 | Serkh .................. | B60K 6/28 123/179.4 |

(Continued)

FOREIGN PATENT DOCUMENTS

| | | |
|---|---|---|
| DE | 102 09 514 A1 | 10/2002 |
| DE | 10 2013 104 511 A1 | 11/2013 |

(Continued)

OTHER PUBLICATIONS

Examination Report dated Jan. 8, 2019 of corresponding German application No. 10 2018 206 050.9; 16 pages.

(Continued)

*Primary Examiner* — Jeffrey J Restifo
(74) *Attorney, Agent, or Firm* — Maier & Maier, PLLC

(57) ABSTRACT

A method for operating a motor vehicle, including an electric machine and a coupling device, which, in a first coupling state, couples the electric machine to a drivetrain and, in a second coupling state, decouples the electric machine from the drivetrain, wherein the method includes the following steps: a) registering an item of coupling information, which specifies whether the coupling device is in the first or second coupling state, b) analyzing a recuperation condition, the fulfillment of which is dependent on the coupling information, wherein the recuperation condition is fulfilled or can only be fulfilled if the coupling device is in the second coupling state, and c) braking the electric machine by operating the electric machine as a generator if the recuperation condition is fulfilled.

15 Claims, 2 Drawing Sheets

(56) References Cited

U.S. PATENT DOCUMENTS

| | | | | |
|---|---|---|---|---|
| 8,066,339 B2* | 11/2011 | Crombez | ............... | B60L 7/18 |
| | | | | 303/152 |
| 8,517,892 B2* | 8/2013 | Schulte | ............... | B60K 6/48 |
| | | | | 477/5 |
| 8,548,707 B2* | 10/2013 | Witte | ............... | B60L 7/24 |
| | | | | 701/70 |
| 8,678,975 B2* | 3/2014 | Koike | ............... | B60K 6/48 |
| | | | | 477/4 |
| 8,932,179 B2* | 1/2015 | Banker | ............... | B60W 10/06 |
| | | | | 477/4 |
| 9,272,697 B2* | 3/2016 | Kuang | ............... | B60W 20/14 |
| 9,340,199 B1* | 5/2016 | Nefcy | ............... | B60W 10/08 |
| 9,352,744 B2* | 5/2016 | Zhao | ............... | B60L 7/18 |
| 9,358,890 B2* | 6/2016 | Nefcy | ............... | B60L 7/18 |
| 9,415,771 B1* | 8/2016 | Shigemoto | ............... | B60K 6/48 |
| 9,481,371 B2* | 11/2016 | Park | ............... | B60W 10/11 |
| 9,527,388 B2* | 12/2016 | Saito | ............... | B60L 7/18 |
| 9,592,832 B2* | 3/2017 | Nedorezov | ............... | B60W 10/026 |
| 9,616,757 B2* | 4/2017 | Lee | ............... | B60W 20/12 |
| 9,630,508 B2* | 4/2017 | Gabor | ............... | B60L 7/18 |
| 9,643,611 B2* | 5/2017 | Shishido | ............... | B60W 10/04 |
| 9,656,652 B2* | 5/2017 | Oh | ............... | B60T 13/74 |
| 9,656,663 B2* | 5/2017 | Nefcy | ............... | B60W 20/14 |
| 9,688,265 B2* | 6/2017 | Ikedaya | ............... | B60W 10/18 |
| 9,701,206 B2* | 7/2017 | Choi | ............... | B60W 20/40 |
| 9,702,304 B1* | 7/2017 | Gaither | ............... | B60W 10/184 |
| 9,771,063 B2* | 9/2017 | Nefcy | ............... | F16H 61/0204 |
| 9,944,269 B2* | 4/2018 | Nefcy | ............... | B60W 30/19 |
| 9,975,451 B2* | 5/2018 | Shepley | ............... | B60W 20/14 |
| 10,059,208 B2* | 8/2018 | Okano | ............... | B60K 6/445 |
| 10,071,724 B2* | 9/2018 | Zhao | ............... | B60L 15/2009 |
| 10,106,149 B2* | 10/2018 | Zhao | ............... | B60K 6/387 |
| 10,112,600 B2* | 10/2018 | Merkle | ............... | B60L 50/15 |
| 10,150,467 B2* | 12/2018 | McCullough | ............... | B60W 20/30 |
| 10,232,839 B2* | 3/2019 | Yang | ............... | B60L 3/108 |
| 10,239,530 B2* | 3/2019 | Yamaguchi | ............... | B60L 7/16 |
| 10,246,077 B2* | 4/2019 | Mouri | ............... | B60W 20/14 |
| 10,246,095 B2* | 4/2019 | Lee | ............... | B60L 7/18 |
| 10,267,412 B2* | 4/2019 | Kuang | ............... | F16H 61/0213 |
| 10,272,902 B2* | 4/2019 | Miyazaki | ............... | B60L 7/26 |
| 10,272,913 B2* | 4/2019 | Boisvert | ............... | B60L 3/106 |
| 10,336,316 B2* | 7/2019 | Kuang | ............... | B60W 10/08 |
| 10,336,334 B2* | 7/2019 | Nefcy | ............... | B60W 50/0097 |
| 10,363,822 B2* | 7/2019 | Park | ............... | B60L 50/16 |
| 10,369,888 B2* | 8/2019 | Kuang | ............... | B60K 6/48 |
| 10,392,018 B1* | 8/2019 | Rhodes | ............... | B60W 30/18127 |
| 10,399,440 B2* | 9/2019 | Zhao | ............... | B60L 7/26 |
| 10,513,265 B2* | 12/2019 | Zhao | ............... | B60L 50/16 |

FOREIGN PATENT DOCUMENTS

| | | |
|---|---|---|
| DE | 11 2012 000 892 T5 | 11/2013 |
| DE | 10 2015 100 290 A1 | 7/2015 |
| DE | 102016209530 A1 | 12/2017 |
| EP | 1431623 A1 | 6/2004 |
| FR | 3017849 A1 | 8/2015 |

OTHER PUBLICATIONS

European Search Report dated Sep. 18, 2019, in corresponding European patent application No. 19 158 472.1 including partial machine-generated English language translation; 11 pages.

* cited by examiner

METHOD FOR OPERATING A MOTOR VEHICLE

FIELD

The disclosure relates to a method for operating a motor vehicle. Furthermore, the invention relates to a motor vehicle

BACKGROUND

Motor vehicles are increasingly being driven by electric motors. In so-called hybrid vehicles, an internal combustion engine is moreover provided, wherein the motor vehicle can be driven both by the electric motor and also by the internal combustion engine. This is advantageous, since the range of electric vehicles is rather short because of a limited capacity of the energy accumulators in comparison to motor vehicles equipped with internal combustion engines.

To extend the range of electric vehicles, it has proven to be expedient to reclaim or recuperate the kinetic energy released during a braking procedure. A braking device for a motor vehicle, the electric motor of which is operable as a generator, is disclosed in document DE 11 2012 000 892 T5. This generator converts the kinetic energy of the motor vehicle during the braking procedure into electrical energy, using which an electrical energy accumulator of the motor vehicle is charged.

SUMMARY

The problem on which the present invention is based is to specify a method improved in relation thereto for operating a motor vehicle, in particular with regard to the operating time of the electrical energy accumulator and the efficiency of the motor vehicle.

The problem is solved according to the invention by a method for operating a motor vehicle, wherein the motor vehicle comprises an electric machine and a coupling device which, in a first coupling state, couples the electric machine to a drivetrain and, in a second coupling state, decouples the electric machine from the drivetrain, wherein the method comprises the following steps:
a) registering an item of coupling information, which specifies whether the coupling device is in the first or second coupling state,
b) analyzing a recuperation condition, the fulfillment of which is dependent on the coupling information, wherein the recuperation condition is fulfilled or can only be fulfilled if the coupling device is in the second coupling state, and
c) braking the electric machine by operating the electric machine as a generator if the recuperation condition is fulfilled.

It is advantageously possible due to the method that in case of a decoupling of the electric machine from the drivetrain, rotational energy possibly stored in a rotor of the electric machine is not lost because of dissipation and/or friction in the electric machine, but rather is reclaimed. The mechanical energy stored in the rotor is converted by the electric machine, which is operated in this method step as a generator, into electrical energy and is thus usable for various purposes. The efficiency of the motor vehicle can thus be improved.

If the coupling device is operated in the first coupling state, i.e., the electric machine is coupled to the drivetrain, the electric machine can then be used as an electric motor for the drive of the motor vehicle. The electrical energy required for this purpose can be provided in this case by an electrical energy accumulator. A torque of the electric machine can be transmitted in this case by the components of a drivetrain to the wheels of the motor vehicle. In particular, the drivetrain can comprise a driveshaft, which can be designed as a propeller shaft, and the coupling device. Moreover, the drivetrain can comprise a differential coupled to the driveshaft, wherein two output shafts coupled to the differential are each connected to one wheel of the motor vehicle.

In contrast, if the coupling device is operated in the second coupling state, the electric machine is then decoupled from the drivetrain and the electric machine therefore can no longer be used to drive the motor vehicle. In this case, the rotor of the electric machine can still be in rotation, however, in particular if the electric machine was used immediately beforehand to drive the motor vehicle. In this case, the recuperation condition can be fulfilled, wherein the electric machine can then be used as a generator.

However, it can also be that the fulfillment of the recuperation condition is dependent on further conditions. It can only be able to be fulfilled, for example, if the electric machine has a specific minimum speed, since otherwise a recuperation cannot be efficient under certain circumstances. Additionally or alternatively, the fulfillment of the recuperation condition can be dependent on a predicted time for how long the coupling device is expected to be in the second coupling state. If the electric machine will only be briefly decoupled, it can be advantageous to maintain the rotation.

In the method according to the invention, it can be provided that a control device is provided for the motor vehicle, wherein the control device can bring the coupling unit from the first into the second coupling state and vice versa by activating an actuator, which is electromechanical in particular. The control device can furthermore be configured to store and/or register by sensor the coupling state thus set. The analysis of the recuperation condition can be performed by the control device. It can be advantageous in this case if this information stored or registered by the control device about the coupling state of the coupling device is analyzed in the scope of the analysis of the recuperation condition.

It is conceivable that the electric machine can also be operated as a generator in the first coupling state if a further recuperation condition is fulfilled. The further recuperation condition can be fulfilled if the vehicle is braked and/or if a brake pedal of the motor vehicle is actuated. It is thus possible for the kinetic energy of the motor vehicle to be converted into electrical energy by the electrical machine operated as a generator and supplied to the electrical energy accumulator. The analysis of the further recuperation condition can also be performed by the control device.

It can be provided in the method according to the invention that at least one item of operating information relating to the operating state of the motor vehicle is registered, wherein the fulfillment of the recuperation condition is additionally dependent on the operating information. The operating information can relate to the speed of the electric machine, wherein the recuperation condition can only be fulfilled if the speed is greater than a predetermined speed limiting value. For example, the speed limiting value can be one revolution per minute. If the speed of the electric machine is less than the limiting value, the recuperation is not advisable, since the rotation energy stored in the electric machine is too small to obtain energy by way of the reclamation. The registration of the speed can be performed by a sensor on the electric machine.

The or a further item of operating information can relate to the velocity of the motor vehicle. It can thus be reasonable, for example, that the recuperation condition is not fulfilled if the vehicle is stationary. If the motor vehicle is waiting at a red traffic signal, for example, and therefore driving away is immediately imminent, the rotation energy stored in the electric machine can thus be used, for example, for the driving away procedure of the motor vehicle, because of which the electric machine should not be braked.

A further item of operating information can relate to the charge state of the energy accumulator. If the energy accumulator is in a fully charged state, a recuperation of the energy stored in the electric machine would thus not be reasonable. Instead, the braking of the rotor of the electric machine can take place due to friction in the electric machine and/or in the drivetrain.

A further item of operating information can relate to a predicted start of the internal combustion engine. If such a start is immediately imminent, the energy stored in the electric machine can be used to start the internal combustion engine instead of for recuperation. Alternatively thereto, the recuperated energy can obviously be used for further electronic systems of the motor vehicle.

In the method according to the invention, it can be provided that at least one item of vehicle information relating to the operating state of the motor vehicle is registered, wherein if a coupling condition dependent on the vehicle information is fulfilled, the coupling device changes into the second coupling state if the coupling device is in the first state. If the coupling condition is fulfilled, the coupling device then changes into the second coupling state, i.e., the electric machine is decoupled from the drivetrain. For example, the vehicle information can relate to the actuation of the brakes, wherein, for example, if full braking is carried out, the coupling device changes from the first into the second operating state, i.e., the electric machine is decoupled from the drivetrain.

The vehicle information can be identical to the operating information or can comprise it. In this case, the same information can have the result that the coupling device changes into the second coupling state and the electric machine is thereupon, after completed change of the coupling state, operated as a generator for recuperation. This can be reasonable, for example, if the motor vehicle is embodied as a hybrid vehicle and the drive is performed by the internal combustion engine or if the vehicle "coasts" in the decoupled state.

It can be provided in the method according to the invention that the motor vehicle is driven by the electric machine if the coupling device is in the first coupling state and a drive condition is fulfilled. This drive condition can be fulfilled, for example, if a driver of the motor vehicle actuates the gas pedal. The analysis of the drive condition can also be performed by the control device.

In the method according to the invention, the energy recuperated from the electric machine upon fulfillment of the recuperation condition can be used to charge the or a further electrical energy accumulator. The operating time of the electrical energy accumulator can thus be extended, since the energy thus stored can again be used to drive the motor vehicle or to operate further electric components.

In the first coupling state, the electric machine can be coupled via a transmission to a component of the drivetrain, wherein the transmission converts the speed of the electric machine to the speed of this component of the drivetrain. The speed of the electric machine can be greater than the speed of this component of the drivetrain, i.e., the transmission ratio of the transmission during a drive of the component by the electric machine is greater than 1. This enables a rapidly rotating electric machine having a relatively small construction to be used for the drive, the torque of which is increased with the aid of the transmission. The transmission can be designed, for example, as a planetary gear, which is coupled via a shaft connected to the electric machine to the driveshaft and/or the drivetrain.

The invention moreover relates to a motor vehicle comprising an electric machine, a coupling device, which, in a first coupling state, couples the electric machine to a drivetrain and, in a second coupling state, decouples the electric machine from the drivetrain, and a control device, wherein the control device is configured to control the operation of the electric machine according to the method.

As already mentioned, the control device can be configured to control the coupling device via an actuator, which is electromechanical in particular, and/or to switch it from the first coupling state into the second coupling state and vice versa. The control device can advantageously be configured to register and/or store the present coupling state. Furthermore, the control device can be configured to register a charge state of the electrical energy accumulator and possibly analyze it.

One refinement of the motor vehicle according to the invention can be that a transmission couples the electric machine to a component of the drivetrain in the first coupling state, wherein the transmission converts the speed of the electric machine to the speed of this component of the drivetrain, wherein the speed of the electric machine is greater than the speed of the component of the drivetrain.

The features described for the method according to the invention are correspondingly transferable with the mentioned advantages to the motor vehicle according to the invention.

BRIEF DESCRIPTION OF THE FIGURES

Further advantages and details of the invention result from the exemplary embodiments described hereafter and on the basis of the drawings. In the schematic figures of the drawings.

DETAILED DESCRIPTION

Figure 1:
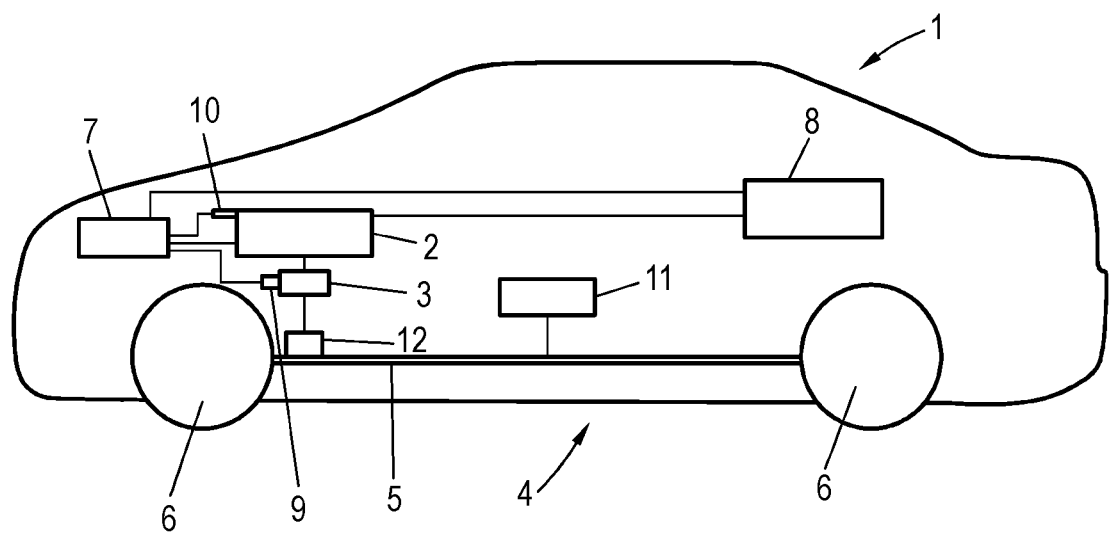
FIG. 1 shows an exemplary embodiment of a motor vehicle according to the invention.

FIG. 1 schematically shows a motor vehicle 1. The motor vehicle 1 comprises an electric machine 2, which can be coupled via a coupling device 3 to a component 5 of a drivetrain 4 of the motor vehicle 1. In the exemplary embodiment shown, the component 5 of the drivetrain 4 is a driveshaft designed as a propeller shaft. The drivetrain 4 furthermore comprises the wheels 6 of the motor vehicle 1. The wheels 6 are connected by a differential gear (not shown) to the component 5 of the drivetrain 4. Further components of the drivetrain 4 are not shown for reasons of comprehensibility. The motor vehicle 1 moreover comprises an electrical energy accumulator 8, in which energy is stored, in particular to drive the motor vehicle 1.

The coupling device 3 is operable in a first coupling state and a second coupling state. In the first coupling state, the electric machine 2 is coupled via the coupling device 3 to the component 5 of the drivetrain 4. In this case, the electric machine 2 can be used as an electric motor to drive the motor vehicle 1, i.e., it converts electrical energy stored in the electrical energy accumulator 8 into kinetic energy of the motor vehicle 1. The electric machine 2 is used in this case as a drive motor for the motor vehicle 1. The coupling between the electric machine 2 and the component 5 of the drivetrain 4 takes place in this case via a transmission 12, which is designed to convert the speed of the electric machine 2 to the speed of the component 5 of the drivetrain 4, wherein the electric machine 2 rotates faster than the component 5. In the second coupling state, the electric machine 2 is decoupled by the coupling device 3 from the component 5 of the drivetrain 4.

It is provided for the motor vehicle 1 that rotation energy possibly stored in a rotor of the electric machine 2 can be recuperated and/or reclaimed for various purposes in the second coupling state, i.e., upon decoupling of the electric machine 2 from the drivetrain 4, by operation of the electric machine 2 as a generator. Details in this regard will be explained hereafter.

Figure 2:
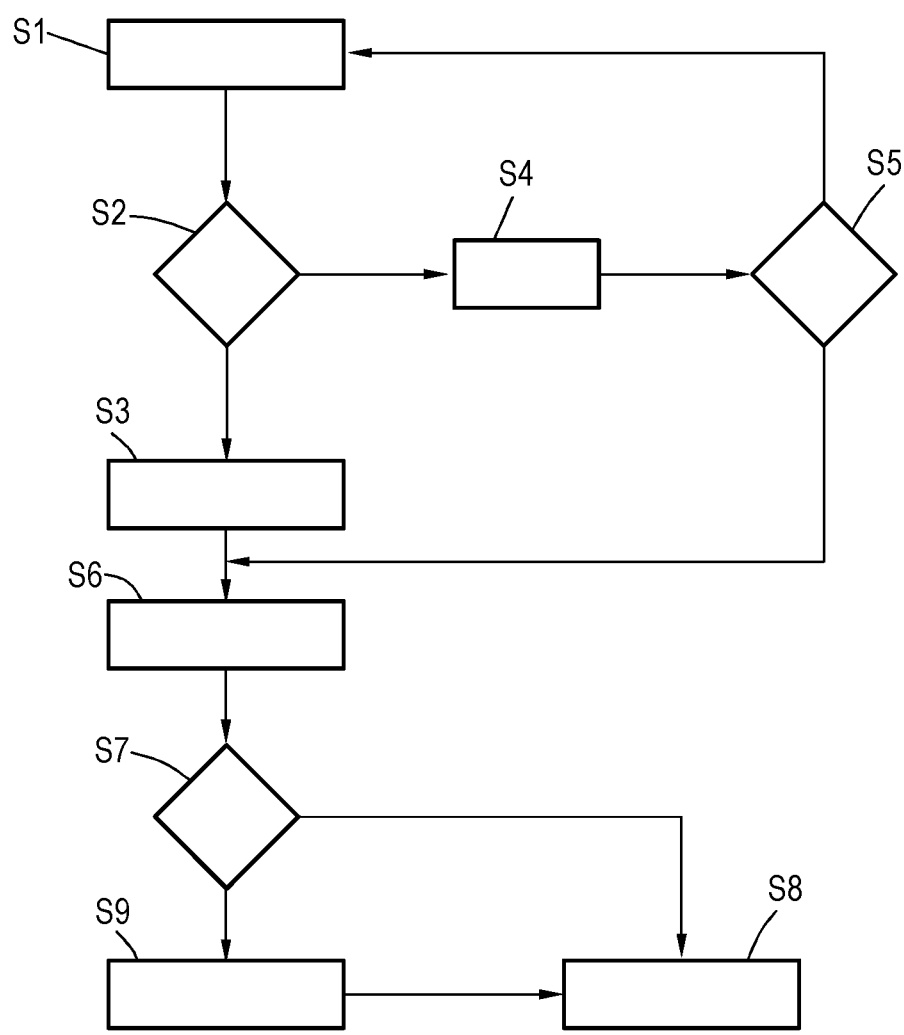
FIG. 2 shows a flow chart of an exemplary embodiment of the method according to the invention.

FIG. 2 shows a flow chart of a method for operating the motor vehicle 1. An item of vehicle information relating to the operating state of the motor vehicle 1 is registered in step S1. This information can specify, for example, whether full braking is carried out or whether the drive of the motor vehicle 1 is to be performed by an internal combustion engine 11, which is coupled for this purpose to the drivetrain 4.

In step S2, the control device 7 analyzes a coupling condition dependent on the vehicle information. If the coupling condition is fulfilled, in step S3, a control device 7 activates an electromechanical actuator 9, which brings the coupling device 3 into the second coupling state. Moreover, the control device 7 stores the present coupling state of the coupling device 3.

In contrast, if the coupling condition is not fulfilled, in step S4, the control device 7 registers the coupling state of the coupling device 3 by way of a sensor (not shown). Alternatively, the registration can take place in that the control device 3 has already previously stored the present coupling state. In step S5, the control device 7 subsequently checks whether the coupling device 3 is in the first or in the second coupling state.

If the coupling device 3 is in the first coupling state, the method is thus repeated from step S1, to monitor the vehicle information and the coupling state in the further driving operation.

If the coupling device 3 is in the second coupling state, whether because it was put into the second coupling state in step S3 or because this coupling state was recognized in step S5, an item of operating information is registered in step S6, wherein the operating information relates, inter alia, to the speed of a rotor of the electric machine 2, which is registered by a sensor 10 and transmitted to the control device 7.

In step S7, the control device 7 analyzes a recuperation condition dependent on the operating information and the coupling state of the coupling device 3. The recuperation condition can only be fulfilled if the coupling device 3 is in the second coupling state. In the exemplary embodiment shown, the fulfillment of this partial condition is already ensured in step S7 by the check of the coupling state in S5 or by the active selection of the second coupling state in S3, respectively, so that a further check of the coupling state can be omitted in principle. As will be explained hereafter, however, it is also possible that the control device still monitors the vehicle information in the background, for example, and can change the coupling state in dependence thereon, independently of the method steps shown. It can therefore be advantageous to explicitly check again in step S7 whether the coupling device is in the second coupling state.

Moreover, the recuperation condition is only fulfilled in step S7 if the speed of the electric machine 2 is greater than a previously defined speed limiting value. The speed limiting value can be one revolution per minute, for example. A recuperation is not expedient if the rotational energy stored in the rotor of the electric machine 2 is excessively small.

In addition, further items of operating information can be analyzed, on which the fulfillment of the recuperation condition in step S7 can depend. The further items of information can relate, for example, to the velocity of the motor vehicle 1 and/or the charge state of an electrical energy accumulator 8. In particular, a recuperation would not be expedient if the electrical energy accumulator is fully charged.

If the recuperation condition is not fulfilled, the method is thus ended in step S8 and can be repeated from step S1, for example, immediately or after passage of a specific waiting time. If the recuperation condition is fulfilled, in step S9, the electric machine 2 is then operated as a generator. In this case, the energy stored in the rotor of the electric machine 2 is reclaimed and advantageously is not lost due to friction. The energy recuperated in this matter is used to charge the electrical energy accumulator 8 of the motor vehicle 1. Moreover, it is conceivable that the recuperated energy is used for further consumers of the motor vehicle 1, for example, for an air conditioner or the like.

During the entire method sequence, the driving operation of the motor vehicle 1 is monitored in the background by the control device 7. During this monitoring, a feedback condition is analyzed, wherein if the feedback condition is fulfilled, the coupling device 3 is brought from the second coupling state into the first coupling state. This takes place, for example, if the coupling device 3 is in the second coupling state and the electric machine 2 is to be used to drive the motor vehicle 1.

For the sake of completeness, it is to be noted that in the method, the operation of the electric machine 2 as a generator can take place not only if the coupling device 3 is in the second coupling state, but rather similarly also if it is in the first coupling state. In this case, kinetic energy of the motor vehicle 1 is converted by the operation of the electric machine as a generator into electrical energy, which is expedient in particular during braking of the motor vehicle 1. The electrical energy thus generated and/or reclaimed is supplied, for example, to the electrical energy accumulator 8, whereby it is charged. The operating time of the energy accumulator 8 is thus extended and thus the efficiency of the motor vehicle 1 is improved.

The invention claimed is:

1. A method for operating a motor vehicle, comprising an electric machine and a coupling device, which, in a first coupling state, couples the electric machine to a drivetrain and, in a second coupling state, decouples the electric machine from the drivetrain, wherein the method comprises the following steps:
   a) registering an item of coupling information, which specifies whether the coupling device is in the first or second coupling state, b) analyzing a recuperation condition, the fulfillment of which is dependent on the coupling information, wherein the recuperation condition is fulfilled or can only be fulfilled if the coupling device is in the second coupling state, and c) braking the electric machine by operating the electric machine as a generator if the recuperation condition is fulfilled;

wherein the drivetrain comprises the wheels of the vehicle;

wherein at least one item of operating information relating to the operating state of the motor vehicle is registered, wherein the fulfillment of the recuperation condition is additionally dependent on the operating information; and wherein the at least one item of operating information relates to one or more of a charge state of at least one energy accumulator of the motor vehicle and a predicted starting of an internal combustion engine of the motor vehicle.

2. The method as claimed in claim 1, wherein the operating information describes the speed of the electric machine and the recuperation condition can only be fulfilled if it is greater than a predetermined speed limiting value.

3. The method as claimed in claim 2, wherein at least one item of vehicle information relating to the operating state of the motor vehicle is registered, wherein if a coupling condition dependent on the vehicle information is fulfilled, the coupling device changes into the second coupling state if the coupling device is in the first coupling state.

4. The method as claimed in claim 2, wherein the motor vehicle is driven by the electric machine if the coupling device is in the first coupling state and a drive condition is fulfilled.

5. The method as claimed in claim 2, wherein the electric machine, if it is used as a generator upon fulfillment of the recuperation condition, charges the at least one electrical energy accumulator.

6. The method as claimed in claim 2, wherein in the first coupling state, the electric machine is coupled via a transmission to a component of the drivetrain, wherein the transmission converts the speed of the electric machine to the speed of this component of the drivetrain, wherein the speed of the electric machine is greater in this case than the speed of this component of the drivetrain.

7. The method as claimed in claim 1, wherein at least one item of vehicle information relating to the operating state of the motor vehicle is registered, wherein if a coupling condition dependent on the vehicle information is fulfilled, the coupling device changes into the second coupling state if the coupling device is in the first coupling state.

8. The method as claimed in claim 7, wherein the motor vehicle is driven by the electric machine if the coupling device is in the first coupling state and a drive condition is fulfilled.

9. The method as claimed in claim 7, wherein the electric machine, if it is used as a generator upon fulfillment of the recuperation condition, charges the at least one electrical energy accumulator.

10. The method as claimed in claim 7, wherein in the first coupling state, the electric machine is coupled via a transmission to a component of the drivetrain, wherein the transmission converts the speed of the electric machine to the speed of this component of the drivetrain, wherein the speed of the electric machine is greater in this case than the speed of this component of the drivetrain.

11. The method as claimed in claim 1, wherein the motor vehicle is driven by the electric machine if the coupling device is in the first coupling state and a drive condition is fulfilled.

12. The method as claimed in claim 11, wherein the electric machine, if it is used as a generator upon fulfillment of the recuperation condition, charges the at least one electrical energy accumulator.

13. The method as claimed in claim 11, wherein in the first coupling state, the electric machine is coupled via a transmission to a component of the drivetrain, wherein the transmission converts the speed of the electric machine to the speed of this component of the drivetrain, wherein the speed of the electric machine is greater in this case than the speed of this component of the drivetrain.

14. The method as claimed in claim 1, wherein the electric machine, if it is used as a generator upon fulfillment of the recuperation condition, charges the at least one electrical energy accumulator.

15. The method as claimed in claim 1, wherein in the first coupling state, the electric machine is coupled via a transmission to a component of the drivetrain, wherein the transmission converts the speed of the electric machine to the speed of this component of the drivetrain, wherein the speed of the electric machine is greater in this case than the speed of this component of the drivetrain.

* * * * *